United States Patent
Saito et al.

(10) Patent No.: US 11,198,448 B2
(45) Date of Patent: Dec. 14, 2021

(54) PASSENGER SUPPORT SYSTEM

(71) Applicant: Yazaki Corporation, Tokyo (JP)

(72) Inventors: Daiki Saito, Shizuoka (JP); Shinichi Okamoto, Shizuoka (JP); Kentaro Otomo, Shizuoka (JP); Hideto Miyake, Shizuoka (JP); Koji Ishii, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 182 days.

(21) Appl. No.: 16/807,300

(22) Filed: Mar. 3, 2020

(65) Prior Publication Data

US 2020/0283013 A1 Sep. 10, 2020

(30) Foreign Application Priority Data

Mar. 7, 2019 (JP) .............................. JP2019-041124

(51) Int. Cl.
```
B60W 50/16      (2020.01)
B60N 2/90       (2018.01)
B60W 60/00      (2020.01)
B60R 11/04      (2006.01)
B60R 11/00      (2006.01)
G05D 1/02       (2020.01)
```

(52) U.S. Cl.
CPC .............. B60W 50/16 (2013.01); B60N 2/90 (2018.02); *B60N 2002/981* (2018.02); *B60R 11/04* (2013.01); *B60R 2011/0003* (2013.01); *B60W 60/001* (2020.02); *G05D 1/0212* (2013.01)

(58) Field of Classification Search
CPC ............... B60W 50/16; B60W 60/001; B60W 2540/229; B60W 2540/227; B60W 2420/42; B60W 60/00253; B60W 60/00133; B60W 50/14; B60W 50/00; B60W 2050/0043; B60N 2/90; B60N 2002/981; B60R 2011/0003; B60R 11/04; G05D 1/0212; H04W 4/48
See application file for complete search history.

(56) References Cited

U.S. PATENT DOCUMENTS

| | | | |
|---|---|---|---|
| 10,303,961 B1 * | 5/2019 | Stoffel | ..................... B60Q 3/76 |
| 2018/0181128 A1 | 6/2018 | Urano | |
| 2020/0001892 A1 | 1/2020 | Aoi et al. | |

FOREIGN PATENT DOCUMENTS

| | | | | |
|---|---|---|---|---|
| DE | 102017117296 A1 * | 2/2018 | ............. | G06Q 10/02 |
| EP | 3617940 A1 * | 3/2020 | ......... | G06K 9/00288 |
| JP | 2002310718 A * | 10/2002 | | |

(Continued)

*Primary Examiner* — Mary Cheung
(74) *Attorney, Agent, or Firm* — Sughrue Mion, PLLC (57) ABSTRACT

A passenger support system includes a speaker, cameras, a vibrator, a seat switch, and a control device. The control device issues destination approach information by the speaker before the vehicle arrives at the destination based on results from comparing the current location information of the vehicle with the destination information of passenger. After issuing the destination approach information, the control device identifies the seat position based on the images captured by the cameras and performs awakening action by the vibrator at the seat corresponding to the specified seat position. The control device stops the awakening action by the vibrator when a stop operation is received from the seat switch.

2 Claims, 4 Drawing Sheets

(56) References Cited

FOREIGN PATENT DOCUMENTS

| | | | |
|---|---|---|---|
| JP | 2003006750 A | * | 1/2003 |
| JP | 2010-20618 A | | 1/2010 |
| JP | 2010078363 A | | 4/2010 |
| JP | 2014229053 A | * | 12/2014 |
| JP | 2015-133050 A | | 7/2015 |
| JP | 2017-102664 A | | 6/2017 |
| JP | 2018-055691 A | | 4/2018 |
| JP | 2018-105774 A | | 7/2018 |
| JP | 2018-147354 A | | 9/2018 |
| JP | 2018-205085 A | | 12/2018 |
| WO | 2018163458 A1 | | 9/2010 |
| WO | 2018/105114 A1 | | 6/2018 |

* cited by examiner

FIG.1

FRONT AND BACK DIRECTIONS

| USER ID | BOARDING POINT INFORMATION | DESTINATION INFORMATION | SEAT POSITION | NON-AWAKE STATE |
|---|---|---|---|---|
| A0011 | OMOTESANDO | TORANOMON HILLS | SEAT 1 | AWAKE |
| B0002 | ROPPONGI 1-CHOME | SENSOUJI TEMPLE | SEAT 2 | NON-AWAKE |
| ... | ... | ... | ... | ... |
| ... | ... | ... | ... | ... |

PASSENGER SUPPORT SYSTEM

CROSS-REFERENCE TO RELATED APPLICATION(S)

The present application claims priority to and incorporates by reference the entire contents of Japanese Patent Application No. 2019-041124 filed in Japan on Mar. 7, 2019.

BACKGROUND OF THE INVENTION

1. Field of the Invention

The present invention relates to a passenger support system.

2. Description of the Related Art

In recent years, vehicle dispatch services are being proposed that call the driver of a taxi running nearby as illustrated on a map, according to the boarding point and the destination specified by a smartphone when a potential passenger utilizes an application (app) by way of a smartphone, etc. to request the dispatch of a vehicle. Moreover, vehicle dispatch services are being proposed to transport a plurality of passengers to different destinations by utilizing self-driving vehicles not requiring a driver.

Japanese Patent Application Laid-open No. 2015-133050 proposes a self-driving vehicle that drives toward pre-set destinations by automatically switching from manual driving mode to self-driving mode for example when the driver loses consciousness during manual operation of the vehicle. Japanese Patent Application Laid-open No. 2018-55691 proposes a self-driving vehicle that automatically switches from self-driving mode to compulsory self-driving mode that forcibly disables the driver operation when, for example, the driver loses consciousness during vehicle operation in self-driving mode.

In a conventional manned taxi, the driver can wake the passenger when the passenger is still asleep even though the vehicle has reached the destination. On the other hand, when utilizing a self-driving vehicle having no driver, there is no driver to awaken the sleeping passenger, so the passenger does not exit the vehicle even on arriving at the destination and the passenger might therefore miss the intended stop. Also in the case of ride-sharing, the sleeping passenger occupies the vehicle seat so that another passenger scheduled to enter the vehicle might be unable to obtain a seat in the vehicle.

SUMMARY OF THE INVENTION

The objective of the present invention is to provide a passenger support system capable of preventing the passenger from missing the passenger's intended stop due to falling asleep.

A passenger support system according to one aspect of the present invention is a passenger support system installed in a vehicle capable of transporting a plurality of passengers, and includes an image capture device that acquires an image of a vehicle interior; a notifier that notifies a passenger within the vehicle interior of a piece of destination approach information indicating that the vehicle is approaching near a destination; a control device that identifies a passenger seat position of a seat where the passenger sits based on the image obtained by the image capture device, and that associates the passenger seat position with a piece of seated passenger destination information corresponding to the destination of the passenger sitting in the seat and retains a piece of associated information; an awakening device that differs from the notifier, and that is installed in each seat and executes awakening action to urge at least a target passenger to awaken; and an operating device that is installed in each seat and receives a stop operation that stops the awakening action by the awakening device, wherein the control device: causes the notifier to notify the passenger of the piece of destination approach information before arrival of the vehicle at the destination corresponding to the piece of seated passenger destination information based on results from comparing a piece of current location information indicating a current location of the vehicle with the piece of seated passenger destination information, identifies the target passenger to awaken in a non-awake state from among the passengers sitting in the passenger seat positions associated with the piece of seated passenger destination information based on the image obtained by the image capture device at least after notification by the notifier, identifies the passenger seat position corresponding to the target passenger to awaken as the target seat position and performs the awakening action on the awakening device corresponding to the target seat position, and stops the awakening action by the awakening device when the stop operation is received by the operating device.

According to another aspect of the present invention, the passenger support system may further include a vehicle control device that determines a drive route of the vehicle based on the piece of current location information and one or more of the pieces of destination information and executes self-driving of the vehicle based on the drive route.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of a passenger support system according to the present invention is hereinafter described in further detail while referring to the accompanying drawings. The present invention however is not limited to the following embodiment. The structural elements in the following embodiment include items easily contrivable by one skilled in the art or items that are substantially the same. The structural elements in the following embodiment may be omitted, substituted or changed in various ways not departing from the spirit and scope of the present invention.

Embodiment

Figure 1:
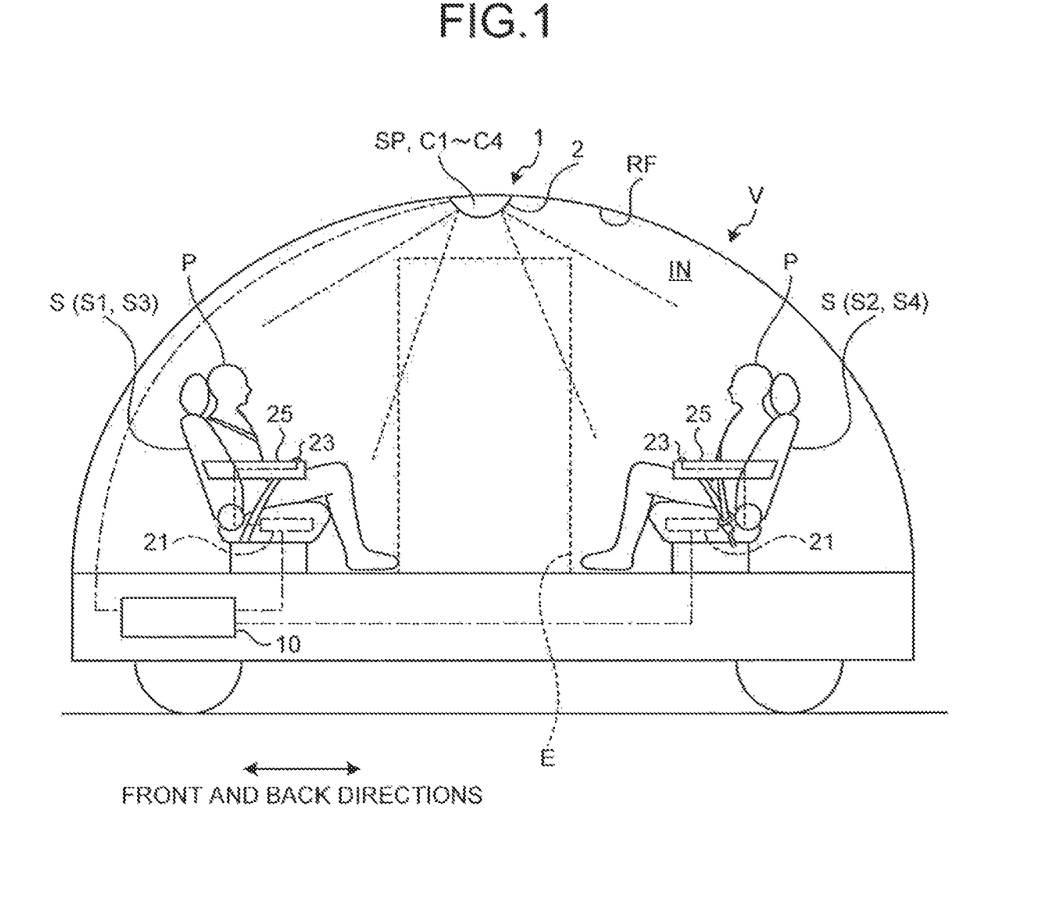
FIG. 1 is a diagram illustrating an overall structure of the vehicle that the passenger support system of the embodiment is applied.
Figure 2:
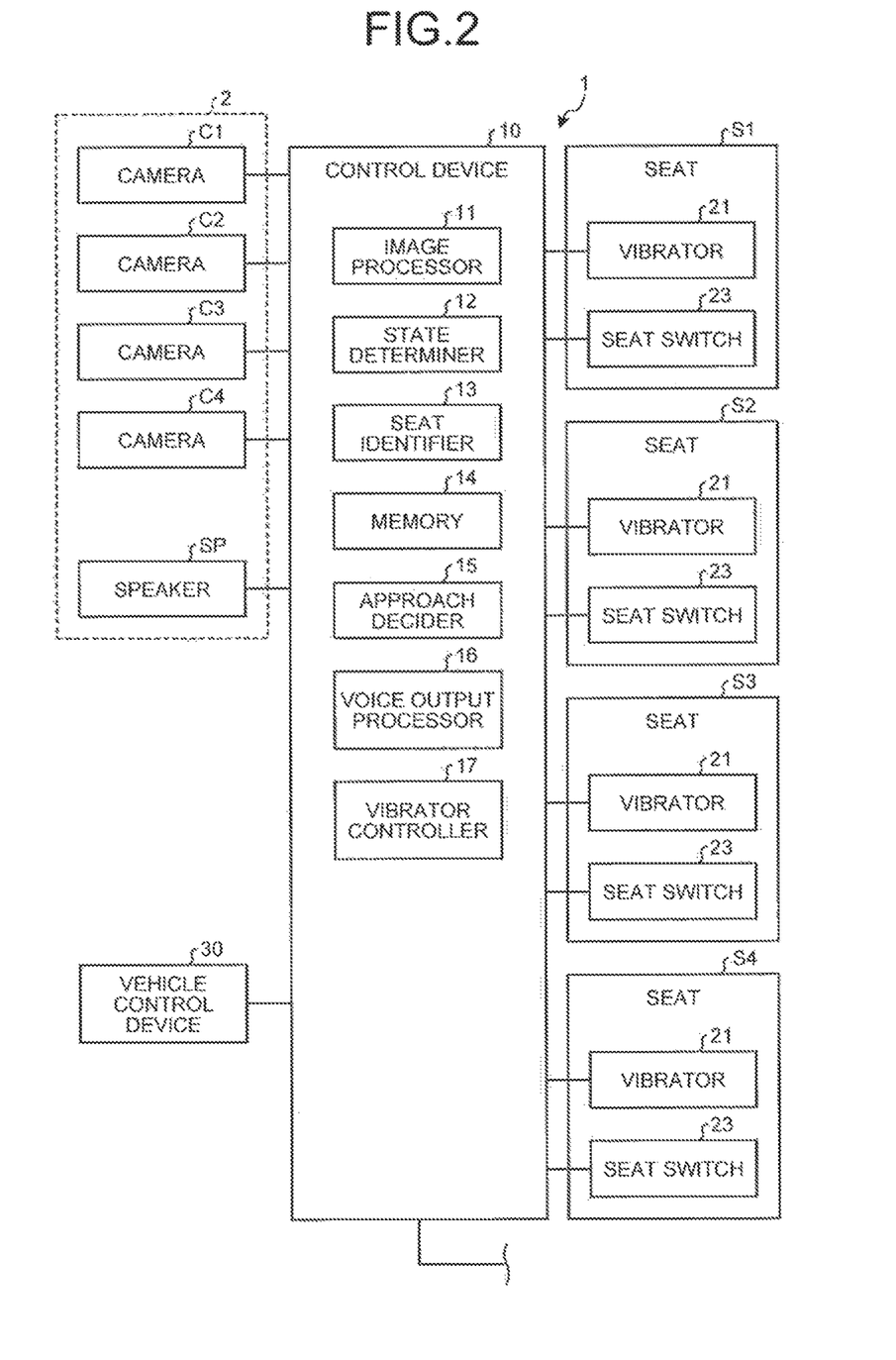
FIG. 2 is a block diagram illustrating an overall structure of the passenger support system of the embodiment.
Figure 3:
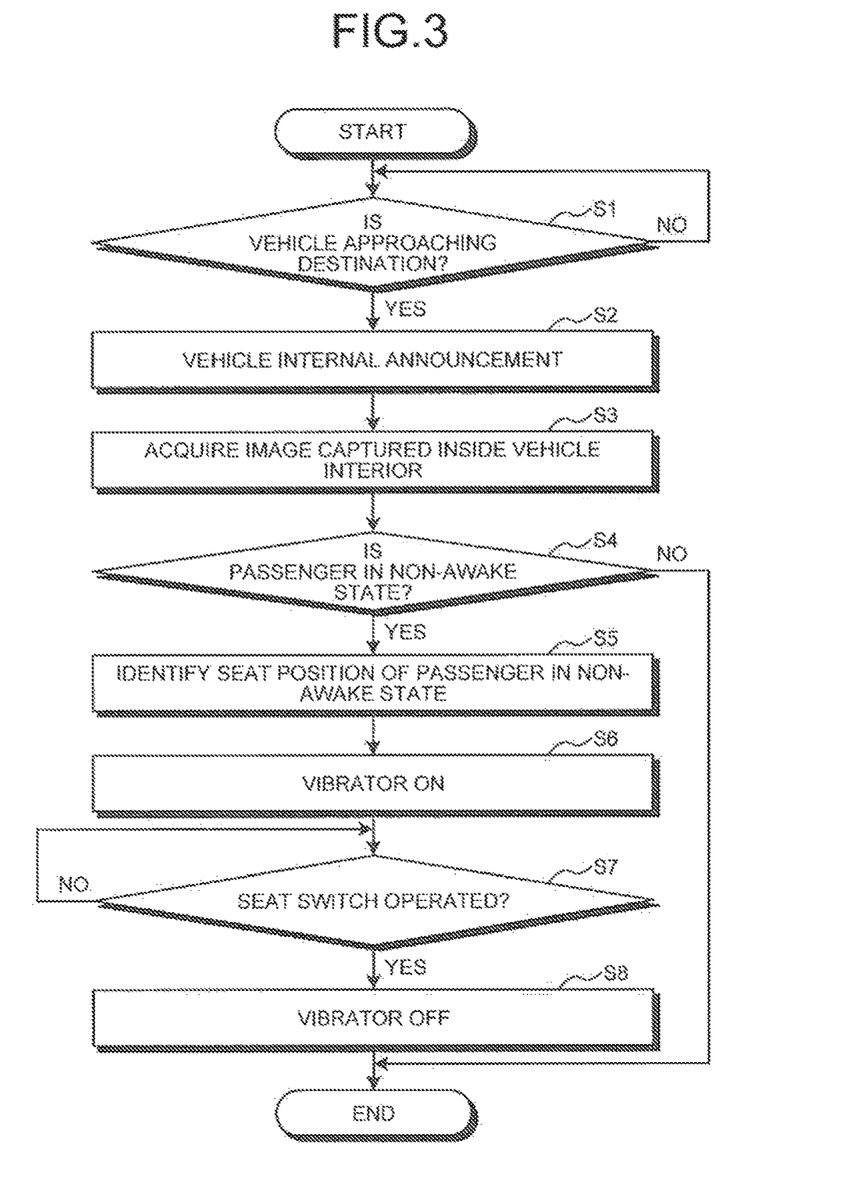
FIG. 3 is a flow chart illustrating an example of the control process that is executed in the passenger support system of the embodiment.
Figure 4:
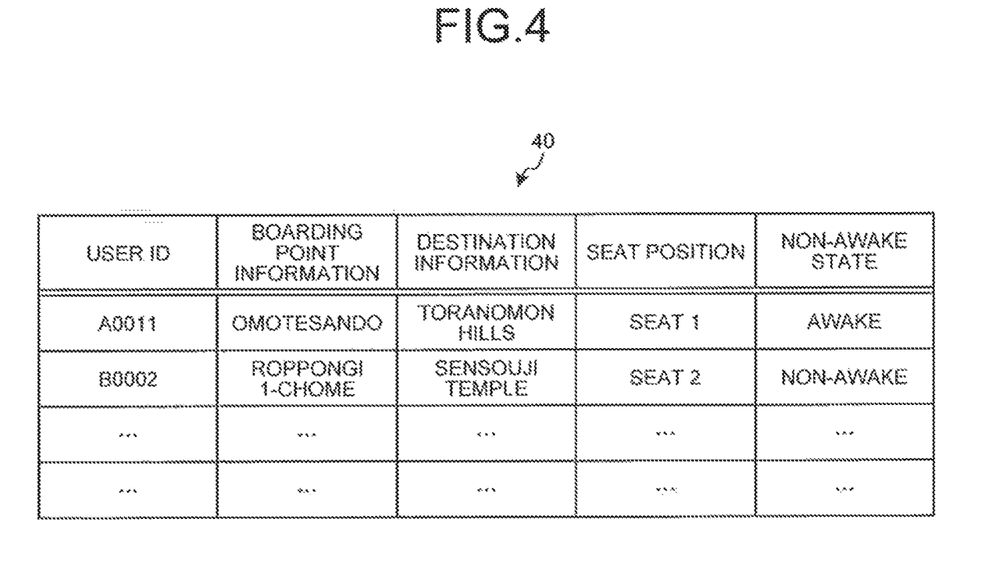
FIG. 4 is a drawing illustrating an example of the control information that is managed in the passenger support system of the embodiment.

A passenger support system according to an embodiment of the present invention is described as follows while referring to FIG. 1 to FIG. 3. FIG. 1 is a diagram illustrating an overall structure of the vehicle utilizing the passenger support system of the embodiment. FIG. 2 is a block diagram illustrating an overall structure of the passenger support system of the embodiment. FIG. 3 is a flow chart illustrating an example of the control process that is executed in the passenger support system of the embodiment. FIG. 4 is a drawing illustrating an example of the control information that is managed in the passenger support system of the embodiment.

The passenger support system 1 according to the present embodiment is for example installed in the vehicle V such as an automobile, as illustrated in FIG. 1. The vehicle V may be any vehicle utilizing a motor or an engine as the drive source such as an electric vehicle (EV), a hybrid electric vehicle (REV), a plug-in hybrid electric vehicle (PHEV), a gasoline-powered vehicle, or a diesel-powered vehicle. The vehicle V may also be what is called a private vehicle owned by an individual or may be a commercial vehicle. The vehicle V according to the present embodiment is described as a vehicle that can be utilized to transport a plurality of passengers P, is managed by particular business operators and utilized by numerous non-specified users, and can be a fully self-driving vehicle that moves automatically to a boarding point and destination (disembarking point) scheduled by the user. If the vehicle V is a fully self-driving vehicle, then in some cases there will probably be no driver.

The vehicle V for example, stops at the boarding point scheduled by the user and drives the user to the destination point. Specifically, the vehicle V decides for example, the drive route based on boarding point information illustrating the user's boarding point, current location information illustrating the current location of the vehicle V, and destination information showing the user's destination by using a navigation device etc. and drives according to the relevant drive route. The vehicle V according to the present embodiment is used for the purpose of ride-sharing as a precondition, and is capable of deciding the drive route based on the boarding point information and the destination information of a plurality of users, and the current location information of the vehicle V and driving according to the relevant drive route. The user for example can make a ride reservation by using an application that is operated on a portable terminal such as a smartphone, and software or the web that is operated on an information processing terminal such as a personal computer (PC). When the user makes a ride reservation using a smartphone etc., reservation information is registered on a cloud server by way of a network such as the Internet and a vehicle is dispatched based on the reservation information. The reservation information for example includes the user ID as information for identifying the user, information on the number of passengers, boarding point information, destination information, and payment methods for the passenger fare.

As illustrated in FIGS. 1 and 2, the vehicle V includes four seats S1, S2, S3, and S4 in the vehicle interior IN. The seats S1 to S4 are for example arrayed along the front and rear direction and the vehicle width direction of the vehicle V. The seats S1 to S4 include the seats S1, S3 installed in the front part of the vehicle V, and the seats S2, S4 installed in the rear part of the vehicle V. The seat S1 is installed in the left front in the vehicle interior IN, and the seat S3 is installed in the right front in the vehicle interior IN. The seat S2 is installed in the left rear in the vehicle interior IN, and the seat S4 is installed in the right rear in the vehicle interior IN. The user boards the vehicle interior IN of vehicle V by way of the opened vehicle doorway E while the vehicle V is stopped in a stopped state and the user sits in a seat among seats S1 to S4 that is not occupied by a passenger P. The seats S1 to S4 are each equipped with seatbelts. The vehicle V for example, includes a board-exit sensor (not illustrated in drawing) installed at the vehicle doorway E to detect passengers P getting on or off the vehicle V, and an attachment sensor (not illustrated in drawing) to detect the attaching of a seat belt by a passenger P sitting in a seat S, and the vehicle departs based on detection results from these sensors.

As illustrated in FIG. 2, the passenger support system 1 includes a speaker SP, cameras C1, C2, C3, and C4, a vibrator 21, a seat switch 23, and a control device 10. The cameras C1 to C4 and the speaker SP are for example contained inside a resin cabinet 2 and mounted in the roof member (roof) RF that is a portion of the vehicle V structure. Besides the cameras C1 to C4 and the speaker SP, the interior of the cabinet 2 also contains a lighting device that illuminates the vehicle interior. IN. The cabinet 2 exposes a portion of the internal cameras C1 to 04 and the speaker SP etc. to the outer side. In the present embodiment, the cabinet 2 is mounted in the roof member RF but the invention is not limited to this arrangement and may preferably be disposed in a position overlooking all of the passengers P sitting in seats S1 to S4 within the vehicle interior IN. The cabinet 2 is mounted on the surface of the vehicle interior IN side of the roof member RF. The speaker SP is an example of a notifier and outputs sounds/voice to all passengers P in the vehicle interior IN. The speaker SP is electrically coupled to the control device 10 and outputs a sound/voice based on the sound signal from the control device 10.

The cameras C1 to C4 are each an example of image acquiring devices and acquire images (still pictures) by taking photographs within the vehicle interior IN. The cameras C1 to C4 each internally include a photographic lens, a shutter, and a charge-coupled device (CCD) image sensor, etc. The object image (optical image) is formed on the light receiving surface of the CCD image sensor. The cameras C1 to C4 are mounted corresponding to the seats S1 to S4 within the vehicle interior IN and each of the cameras captures images grouped into 4 image capture ranges of the vehicle interior IN. Specifically, the camera C1 corresponds to the seat S1, the camera C2 corresponds to the seat S2, the camera C3 corresponds to the seat S3, and the camera C4 corresponds to the seat S4. The cameras C1 to C4 are each electrically coupled to the control device 10, capture images of a predetermined image capture range, and output data of the relevant image to the control device 10. The camera C1 captures images of the image capture range including seat S1 of the vehicle interior IN, and outputs the relevant image data to the control device 10. The camera C2 captures images of the image capture range including seat S2 of the vehicle interior IN, and outputs the relevant image data to the control device 10. The camera C3 captures images of the image capture range including seat S3 of the vehicle interior. IN, and outputs the relevant image data to the control device 10. The camera C4 captures images of the image capture range including seat S4 of the vehicle interior IN, and outputs the relevant image data to the control device 10. The cameras C1 to C4 preferably include for example, a light source for illuminating the image capture range. In this case, sharp images can be captured of the image capture range in dark environments such as within tunnels and at nighttime.

The light source is for example a near-infrared light emission diode (near-infrared LED).

The vibrator 21 is an example of an awakening device and is installed in each seat S (S1 to S4) and performs awakening action to urge a passenger P sitting in the seat S to wake up. This awakening action is for example the vibration from the vibrator 21. The vibrator 21 is for example installed inside the seat cushion of the seat S so as to convey the vibration to the passenger P sitting in the seat S. The vibrator 21 generates a vibration from a drive signal from an external source, and stops the vibration by a stop signal from an external source. The vibrator 21 is electrically coupled to the control device 10 and generates vibration according to a vibration signal from the control device 10, and stops the vibration by way of a stop signal from the control device 10.

The seat switch 23 is an example of an operating device. The seat switch 23 is installed in each seat S, and receives a stop operation for stopping the awakening action of the vibrator 21. The seat switch 23 includes for example a pushbutton switch that is installed in the elbow rest 25 of the seat S. The seat switch 23 is electrically coupled to the control device 10 and connects or shuts off the loop-shaped electric circuit. The seat switch 23 opens the internal contact points and shuts off the loop-shaped electrical circuit according to the pressing action by the fingers of the passenger P. When the seat switch 23 shuts off the electrical circuit, the control device 10 outputs a stop signal to the vibrator 21 and stops the vibrator 21 that is in a vibrating state.

In the present embodiment, the stopping of the vibrator 21 according to the operation of the seat switch 23 is preferably specified to the passenger P. The method for stopping the vibrator 21 may for example be expressed using an illustration and placed in the vicinity of the seat switch 23. The method for stopping the vibrator 21 may also be a method giving guidance by voice from the speaker SP. The method for stopping the vibrator 21 may also be a method with a guide panel illustrating the stopping method placed within range of the eyes of the seated passenger P. The guide panel may for example be a panel member and may be a display screen such as a liquid crystal display.

The control device 10 provides overall control of all portions of the passenger support system 1. The control device 10 for example controls the driving of the speaker SP, the cameras C1 to C4, and the vibrator 21. The control device 10 detects the shutting off by the seat switch 23. The control device 10 includes central processing devices such as central processing units (CPU), micro processing units (MPU), application specific integrated circuits (ASIC), and field programmable gate arrays (FPGA), and read only memories (ROM), random access memories (RAM), and electrical circuits having the known art microcomputers including interfaces as the main element. The control device 10 identifies the passenger seat position of the seat S that the passenger P is sitting in based on the image obtained from the cameras C1 to C4, and the passenger seat position is associated with the seated passenger destination information corresponding to the destination of the seated passenger P in seat S and is retained (control information 40 in FIG. 4). The control device 10 includes an image processor 11, a state determiner 12, a seat identifier 13, a memory 14, an approach decider 15, a voice output processor 16, and a vibrator controller 17. The control device 10 is electrically coupled to a vehicle control device 30.

The image processor 11 acquires a plurality of images captured by the cameras C1 to C4 and performs image processing on each image. Specifically, the image processor 11 analyzes each image and decides if the passenger. P is present in each image. The image processor 11, for example, compares the target analysis image with the source image stored beforehand in the memory 14 and judges if there is any difference. The source image is for example, an image captured by cameras C1 to C4 in a state with no passengers P in the vehicle interior IN, and there are no passengers P seated in any of the seats S. When there is a difference between the source image and the target analysis image, a judgement is made as to whether a passenger P or object other than a passenger P is occupying a specific surface area in the difference area. An object other than passenger P is for example baggage that the passenger P brings into the vehicle interior IN. The image processor 11 identifies the image in which passenger. P appears, based on results from comparing the source image and the target analysis image.

The state determiner 12 decides the state of the relevant passenger P in the image that passenger P appears. The state determiner 12 decides if the passenger P is in a seated state or not. The state determiner 12 for example decides if the contour of the above described difference area is formed to match the contour of the seat S or not, and if the contour of the difference area matches the contour of the seat S, decides that the passenger P is in a seated state. The state determiner 12 decides if the passenger P is in a non-awake state or namely is sleeping (or napping) or not. The state determiner 12 for example decides if the passenger. P's eyes are open or closed, and if the eyes are closed, decides that the passenger P is sleeping. If the eyes are closed, however, there is the possibility that the eyes are blinking so a decision as to whether passenger P is sleeping or not can be made by utilizing the images (consecutive images) that are captured over time. The state determiner 12 detects the above-mentioned target passenger to awaken based on the images that are obtained from the cameras C1 to C4. The state determiner 12 links a user ID with the target passenger to awaken and stores that user ID of the target passenger to awaken in the memory 14 in order to distinguish the target passenger to awaken from the other passengers (passengers in an awake state) (FIG. 4).

The seat identifier 13 identifies the seat position of the seat S where the target passenger to awaken is sitting based on the relevant image where the target passenger to awaken is detected. For example, the seat identifier 13 identifies from which of the cameras C1 to C4 the target image is obtained and identifies the seat position of the seat S corresponding to the specified camera C. The seat identifier 13 temporarily stores the specified seat position in the memory 14 as the seat position information.

The memory 14 is a memory that stores various information. The memory 14 is for example a comparatively large-capacity storage device such as hard disks, solid state drives (SSD), and optical disks, or a semiconductor memory capable of rewriting such as random access memories (RAM), flash memories, non-volatile static random access memories (NVSRAM). The memory 14 stores information and conditions required for each type of processing in the control device 10, and stores control data and each type of program and application for execution on the control device 10. The memory 14 for example stores the images data that is captured by the cameras C1 to C4. The memory 14 is capable of temporarily storing the user ID of the passenger P, boarding point information of the passenger P, destination information, and seating position as the management information 40 illustrated in FIG. 4. The memory 14 is capable of temporarily storing information such as information on the number of passengers and current location information of the vehicle V that is acquired from navigation devices, etc. The image processor 11, etc. loads (reads out) the information from the memory 14.

The approach decider 15 decides whether the vehicle V is approaching near the destination based on the results from comparing at least the destination information with the current location information. For example, the current location information and the destination information are obtained from the navigation device, etc. installed in the vehicle V, and temporarily stored in the memory 14. The approach decider 15 for example calculates the scheduled arrival time at the destination based on the current location information, destination information, average vehicle speed of the vehicle V, traffic congestion on the drive route, and (traffic) regulation information, etc. and decides whether the time is five minutes prior to the scheduled arrival time. The five minutes prior time is only an example and the value may be changed as is needed to allow time for the passenger P to get off (the vehicle). The approach decider 15 outputs a trigger signal to the voice output processor 16 when for example, the time of five minutes before the scheduled arrival time is reached.

The voice output processor 16 is an example of a notifier. The voice output processor 16 notifies the passenger P in the vehicle interior IN of destination approach information indicating that the vehicle V is approaching near the destination according to trigger signals input by the approach decider 15. The destination approach information is an announcement that informs one passenger P among the passengers P that the vehicle is approaching near the destination, and the announcement for example is "This vehicle will soon arrive at XX (destination)". The voice output processor 16 generates a voice signal output from the speaker SP based on the voice information that is stored in the memory 14 and the destination information, and outputs the relevant voice signal from the speaker SP as the destination approach information. The voice output processor 16 can also generate notification information for notifying the passenger P based on voice information stored in the memory 14 and output the notification information from the speaker SP.

The vibrator controller 17 performs drive control of the vibrator 21. The vibrator controller 17 outputs a drive signal to the vibrator 21 for the seat S serving as the target (seat) based on the seat position information that is stored in the memory 14 and generates vibration from the relevant vibrator 21. The seat S serving as the target is the seat where the target passenger to awaken is sitting. The vibrator controller 17 monitors the connection status of the seat switch 23 for the seat serving as the target, and outputs a stop signal to the vibrator 21 of the seat S corresponding to the relevant seat switch 23 according to the shut-off state of the seat switch 23, and stops the vibrator 21 that is vibrating.

The vehicle control device 30 is an example of a vehicle control device and controls various operations of the vehicle V. The vehicle control device 30 for example executes driving control of the vehicle V and control to open and close the vehicle doorway E of the vehicle V. The vehicle control device 30 controls various types of actuators that are installed in the vehicle V. The actuators that are installed in the vehicle V include a vehicle drive actuator, a braking actuator, a steering actuator, and an opening/closing actuator for the vehicle doorway E. The vehicle control device 30 is capable of automatically driving the vehicle V. The vehicle control device 30 acquires information from various types of sensors or the navigation device installed in the vehicle V, controls the actuators based on the acquired information, and automatically drives the vehicle V. The vehicle control device 30 decides the drive route of the vehicle V based on at least the current location information and one or more of the pieces of destination information, and performs self-driving of the vehicle V based on the relevant drive route. This drive route can be changed as needed according to the boarding point and the destination where a passenger P newly entered the vehicle V.

An example of the action processing in the passenger support system 1 is described next while referring to the flow chart in FIG. 3. The control device 10 identifies the passenger seat position of the seat S in which the passenger P is sitting based on the image obtained beforehand from the cameras C1 to C4, and associates the passenger seat position and seated passenger destination information for passenger P sitting in seat S and retains that associated information.

In step S1, the approach decider 15 of the control device 10 decides if the vehicle V has approached near the destination. Specifically, the approach decider 15 decides whether the vehicle V has approached the destination (destination corresponding to the seated passenger destination information) based on results from comparing current location information and destination information (seated passenger destination information). When the approach decider 15 decides that the vehicle V has approached near the destination (Yes at S1), the process proceeds to step S2. When the approach decider 15 decides on the other hand that the vehicle V has not approached the destination (No at S1), the process repeats step S1.

Next, in step S2, the voice output processor 16 of the control device 10 performs a vehicle internal announcement from the speaker SP. Specifically, the voice output processor 16 notifies the passenger P in vehicle interior IN of the destination approach information.

In step S3, the cameras C1 to C4 acquire images of the vehicle interior TN and output the relevant image data to the control device 10.

In step S4, the state determiner 12 of the control device 10 decides whether the passenger P is in a non-awake state based on the images captured by the cameras C1 to C4. Specifically, the image processor 11 of the control device 10 identifies the image where the passenger P appears based on the images obtained from the cameras C1 to C4. The state determiner 12 determines whether the passenger. P is in a non-awake state based on the images where the passenger P appears. If not in a non-awake state or namely if the state determiner 12 determines the passenger P is awake, the process ends. On the other hand, if in a non-awake or namely if passenger P is determined to be in a sleeping state, the process proceeds to step S5.

In step S5, the seat identifier 13 of the control device 10 identifies the seat position that the passenger P in a non-awake state is sitting. Specifically, the seat identifier 13 identifies the seat position of the seat S that the target passenger to awaken in a non-awake state is sitting among the passengers P in passenger seat positions that are associated with the seated passenger destination information, identifies the passenger seat position corresponding to the target passenger to awaken, as the target seat position, and temporarily stores the specified seat position in the memory 14 as the seat position information.

In step S6, the vibrator controller 17 of the control device 10 starts (ON) the vibrator 21 for the seat S corresponding to the seat position that is identified in step S5. Specifically, the vibrator controller 17 outputs a drive signal to the vibrator 21 for the target seat S based on the seat position information that is stored in the memory 14, and generates vibration from the vibrator 21.

In step S7, the vibrator controller 17 decides whether the seat switch 23 has been operated. Specifically, the vibrator controller 17 monitors the coupled state of the seat switch 23 and decides whether the seat switch 23 has been shut off. When the seat switch 23 has been operated, or namely when the seat switch 23 has been shut off (Yes at S7), the process proceeds to step S8. When on the other hand, the seat switch 23 has not been operated (No at S7), or namely the seat switch 23 has not shut off, the process repeats step S7.

In step S8, the vibrator controller 17 stops (OFF) the vibrator 21 that is vibrated in step S6. Specifically, the vibrator controller 17 outputs a stop signal to the vibrator 21 of the seat S corresponding to the seat switch 23 that is turned off and stops the vibrator 21 from vibrating, and the process ends.

The passenger support system 1 according to the present embodiment as described above includes a speaker SP, the cameras C1 to C4, the vibrator 21, the seat switch 23, and the control device 10. The control device 10 issues the destination approach information from the speaker SP before the vehicle V arrives at the destination based on results from comparing the current location information of the vehicle V with the destination information of passenger P. The passenger P can in this way prepare to get off the vehicle V before the vehicle V arrives at the destination (location to get off the vehicle) and can smoothly get off the vehicle V after it stops. After notification of the destination approach information, the control device 10 identifies the seat position based on the images that are obtained from the cameras C1 to C4, and executes the awakening action by the vibrator 21 for the target seat S of the corresponding seat position. In this way, when the passenger P that must get off the vehicle at the next destination is sleeping, the relevant passenger P can be awakened without informing the other passengers P, so the passenger P can be prevented from missing the scheduled stop. Also, the control device 10 stops the awakening action by the vibrator 21 when the stop operation is received from the seat switch 23. The vibrator 21 in this way continues the vibrating until the sleeping passenger P awakens and operates the seat switch 23 so that the passenger P is awakened in a more effective way. The passenger support system according to the present embodiment can therefore automatically awaken the sleeping passenger P when approaching near the destination so that the passenger P can be prevented from missing the scheduled stop and the passenger P can relax while in the vehicle interior IN. The passenger P is in this way prevented from missing the scheduled stop so that the vehicle operation and the vehicle dispatch service are efficiently performed.

The passenger support system 1 according to the present embodiment further includes a vehicle control device 30 that determines the drive route of the vehicle V based on the current location information and one or more of the pieces of destination information, and performs self-driving of the vehicle V based on the drive route. In this way, when an unmanned self-driving vehicle is transporting a passenger P by ride-sharing, the passenger P is automatically awakened when approaching near the destination even without a driver, so that the passenger P can be prevented from missing the scheduled stop and the passenger P can relax while in the vehicle interior IN. Also the same as described above, the vehicle operation and the vehicle dispatch service by an unmanned self-driving vehicle with no driver can be efficiently performed.

Also in the present embodiment described above, the control device 10 is coupled by wires such as cables or electrical wiring to the cameras C1 to C4, the speaker. SP, the vibrator 21, and the seat switch 23, however, the coupling may also be achieved by wireless (radio) measures. A wireless coupling may for example, be achieved by near field communication such as Bluetooth (registered trademark) or WiFi.

Also in the present embodiment described above, the four cameras C1 to C4 are installed to correspond to the four seats S1 to S4 in an arrangement for capturing images within the image capture areas of the vehicle interior IN grouped into four respective sub-divisions. The present invention however is not limited to this arrangement and, for example, an arrangement may be employed so that one camera C captures images throughout the complete area of the vehicle interior IN. In this case, one camera C (for example, a 360-degree camera) can consecutively capture images of the entire vehicle interior IN including the seats S by rotating horizontally while facing toward the vehicle interior IN. Also, the cameras C1 to C4 capture still images, however, moving images (video) may be captured. In this case, the image processor 11 may acquire still images from the captured moving images (video).

In the present embodiment described above, a vibrator 21 is installed in each seat S, however the invention is not limited to this arrangement if there is an arrangement to awaken a passenger. P that is sitting and also in a non-awake state. For example, a heater may be installed instead of the vibrator 21. In this case, the passenger P in a non-awake state can be awakened by the change in the temperature of the seat S. Also for example, a balloon may be installed within the seat S instead of the vibrator 21. In this case, the passenger P in a non-awake state can be awakened by the change in the contour of the seat surface of the seat S by feeding air to expand the balloon so that the seat surface of the seat S is elevated. Also, a signal can be output to the portable terminal such as a smartphone of the passenger P in a non-awake state, and the passenger P in a non-awake state can be awakened by utilizing the vibrator function in the relevant portable terminal. Also, an arrangement that drops (reclines) the seat S may be employed instead of the vibrator 21. The vibrator 21 may also be installed within the backrest or headrest of the seat S. Also, a directional speaker may be utilized to notify the passenger P instead of the vibrator 21.

In the present embodiment described above, the seat switch 23 is installed in the elbow rest 25 of the seat S, however the present invention is not limited to this arrangement. The seat switch 23 may also for example be installed in the side surface of the seat cushion of the seat S, or may be installed at the periphery of the seat belt buckle. The seat switch 23 receives a pressing action from the finger pressure of the passenger P, however the present invention is not limited to this arrangement. For example, the passenger P may perform a predetermined gesture. In this case for example, the camera C constantly monitors (captures images) the passenger P and the control device 10 outputs a stop signal to the vibrator 21 by detecting a predetermined action by the passenger P by way of the image processor 11.

In the present embodiment described above, the passenger support system 1 notifies the passenger P of the destination approach information by including at least a speaker SP and a voice output processor 16 of the control device 10. However, the present invention is not limited to this arrangement and for example may employ an arrangement to notify the passenger P of the destination approach information that is loaded into the navigation device in the vehicle V.

The above described control device 10 may be a structure where each part is in a separate unit and each part is coupled to allow mutually sending and receiving electrical signals of various types, and may be a structure where a portion of the functions are implemented by way of other control devices. Also, the above described programs, applications, and various data may be updated as needed, and may also be stored on a server coupled to the passenger support system 1 by way of an optional network. The above described programs, applications, and various data for example can be entirely or partially downloaded as needed. Also, for example the processing functions included in the control device 10 may be entirely or partially implemented by a CPU etc. or by a program interpreted and implemented by the CPU, or may be implemented as hardware by wired logic, etc. Each of the processing functions included in the control device 10 are for example processing functions of the above described image processor 11, state determiner 12, seat identifier 13, approach decider 15, and the voice output processor 16.

The passenger support system according to the present embodiment may be an appropriate combination of the above described embodiment and structural elements of a modification.

The passenger support system of the present embodiment renders the effect of preventing the passenger from missing the scheduled stop, for example in a self-driving vehicle with no driver by automatically awakening the passenger when the vehicle approaches near the destination even if the passenger is asleep prior to arrival at the destination.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A passenger support system installed in a vehicle capable of transporting a plurality of passengers, the passenger support system comprising:

an image capture device that acquires an image of a vehicle interior;

a notifier that notifies a passenger within the vehicle interior of a piece of destination approach information indicating that the vehicle is approaching near a destination;

a control device that identifies a passenger seat position of a seat where the passenger sits based on the image obtained by the image capture device, and that associates the passenger seat position with a piece of seated passenger destination information corresponding to the destination of the passenger sitting in the seat and retains a piece of associated information;

an awakening device that differs from the notifier, and that is installed in each seat and executes awakening action to urge at least a target passenger to awaken; and an operating device that is installed in each seat and receives a stop operation that stops the awakening action by the awakening device, wherein the control device:

causes the notifier to notify the passenger of the piece of destination approach information before arrival of the vehicle at the destination corresponding to the piece of seated passenger destination information based on results from comparing a piece of current location information indicating a current location of the vehicle with the piece of seated passenger destination information, identifies the target passenger to awaken in a non-awake state from among the passengers sitting in the passenger seat positions associated with the piece of seated passenger destination information based on the image obtained by the image capture device at least after notification by the notifier, identifies the passenger seat position corresponding to the target passenger, to awaken as the target seat position and performs the awakening action on the awakening device corresponding to the target seat position, and stops the awakening action by the awakening device when the stop operation is received by the operating device.

2. The passenger support system according to claim 1, further comprising:

a vehicle control device that determines a drive route of the vehicle based on the piece of current location information and one or more of the pieces of destination information and executes self-driving of the vehicle based on the drive route.

* * * * *